(12) United States Patent
Robinson et al.

(10) Patent No.: US 9,762,148 B2
(45) Date of Patent: Sep. 12, 2017

(54) PRE-COLLAPSED CAPACITIVE MICRO-MACHINED TRANSDUCER CELL WITH ANNULAR-SHAPED COLLAPSED REGION

(71) Applicant: KONINKLIJKE PHILIPS N.V., Eindhoven (NL)

(72) Inventors: Andrew Lee Robinson, Bellevue, WA (US); John Douglas Fraser, Woodinville, WA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 397 days.

(21) Appl. No.: 14/351,888

(22) PCT Filed: Nov. 5, 2012

(86) PCT No.: PCT/IB2012/056152
§ 371 (c)(1),
(2) Date: Apr. 15, 2014

(87) PCT Pub. No.: WO2013/072803
PCT Pub. Date: May 23, 2013

(65) Prior Publication Data
US 2014/0265721 A1    Sep. 18, 2014

Related U.S. Application Data

(60) Provisional application No. 61/560,836, filed on Nov. 17, 2011.

(51) Int. Cl.
*B06B 1/02* (2006.01)
*H02N 1/00* (2006.01)

(52) U.S. Cl.
CPC ............... *H02N 1/006* (2013.01); *B06B 1/02* (2013.01); *B06B 1/0292* (2013.01); *Y10T 29/49005* (2015.01)

(58) Field of Classification Search
CPC ....... H04R 17/00; H02N 11/00; B06B 1/0292
USPC ................... 310/300; 367/174, 181; 381/174
See application file for complete search history.

(56) References Cited

U.S. PATENT DOCUMENTS

| 7,305,890 | B2 | 12/2007 | Zias et al. |
| 7,701,110 | B2 * | 4/2010 | Fukuda ................. B06B 1/0292 310/309 |
| 8,371,018 | B2 | 2/2013 | Chang |
| 8,559,274 | B2 | 10/2013 | Huang |

(Continued)

FOREIGN PATENT DOCUMENTS

| EP | 2269746 A1 | 1/2011 |
| JP | 2004536455 A | 12/2004 |
| JP | 2009100459 A | 5/2009 |

(Continued)

*Primary Examiner* — Burton Mullins

(57) ABSTRACT

The present invention relates to a pre-collapsed capacitive micro-machined transducer cell (10) comprising a substrate (12) comprising a first electrode (16), a membrane (14) comprising a second electrode (18), wherein the cell has an outer region (22) where the membrane (14) is mounted to the substrate (12) and an inner region (20) inside or surrounded by the outer region (22), wherein the membrane (14) is collapsed to the substrate (12) in a first collapsed annular-shaped region (24) located within the inner region (20).

16 Claims, 9 Drawing Sheets

(56) References Cited

U.S. PATENT DOCUMENTS

2006/0004289 A1    1/2006  Tian et al.
2010/0202254 A1*  8/2010  Roest .................... B06B 1/0292
                                                             367/180

FOREIGN PATENT DOCUMENTS

| JP | 2012-95112 | * | 5/2012 | ............... H04R 1/32 |
| WO | 2009037655 A2 | | 3/2009 | |
| WO | 2010097729 A1 | | 9/2010 | |

* cited by examiner

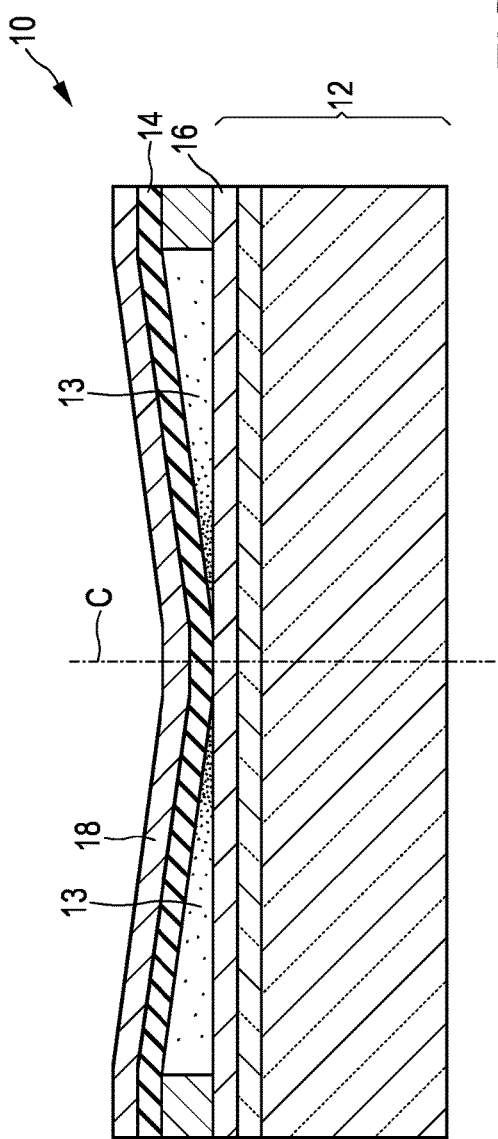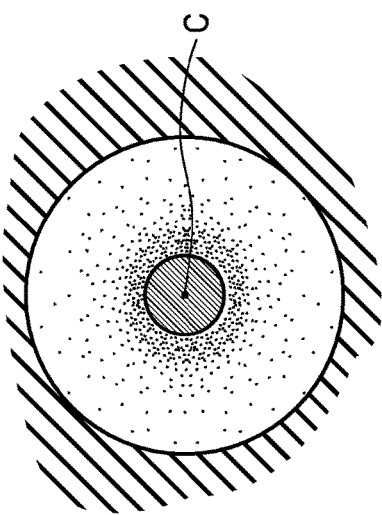

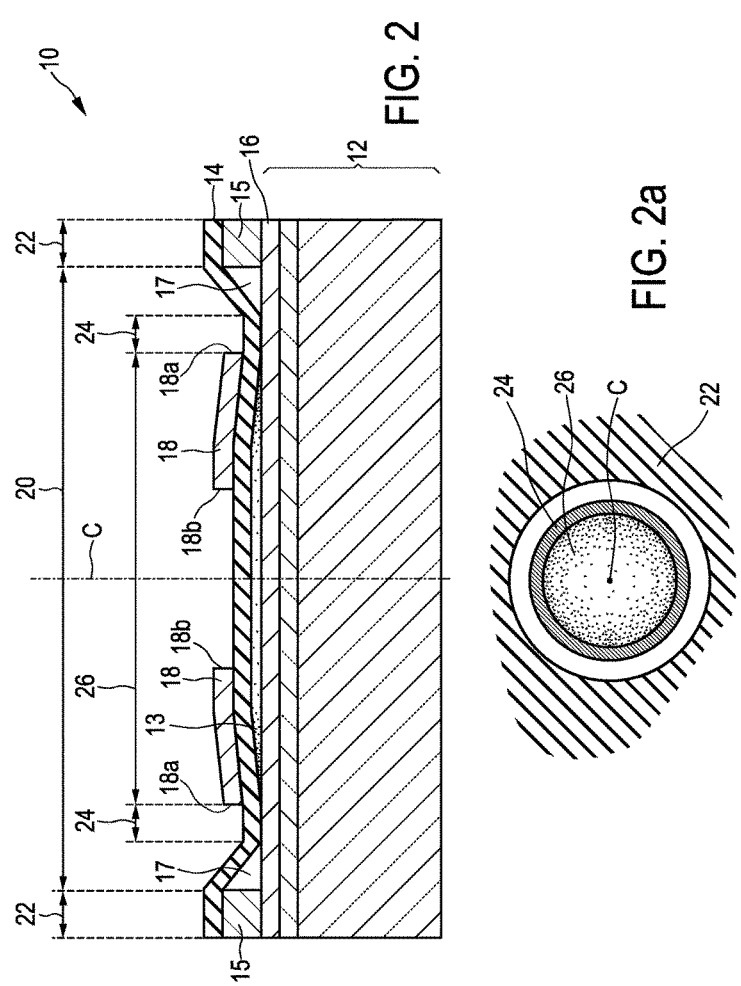

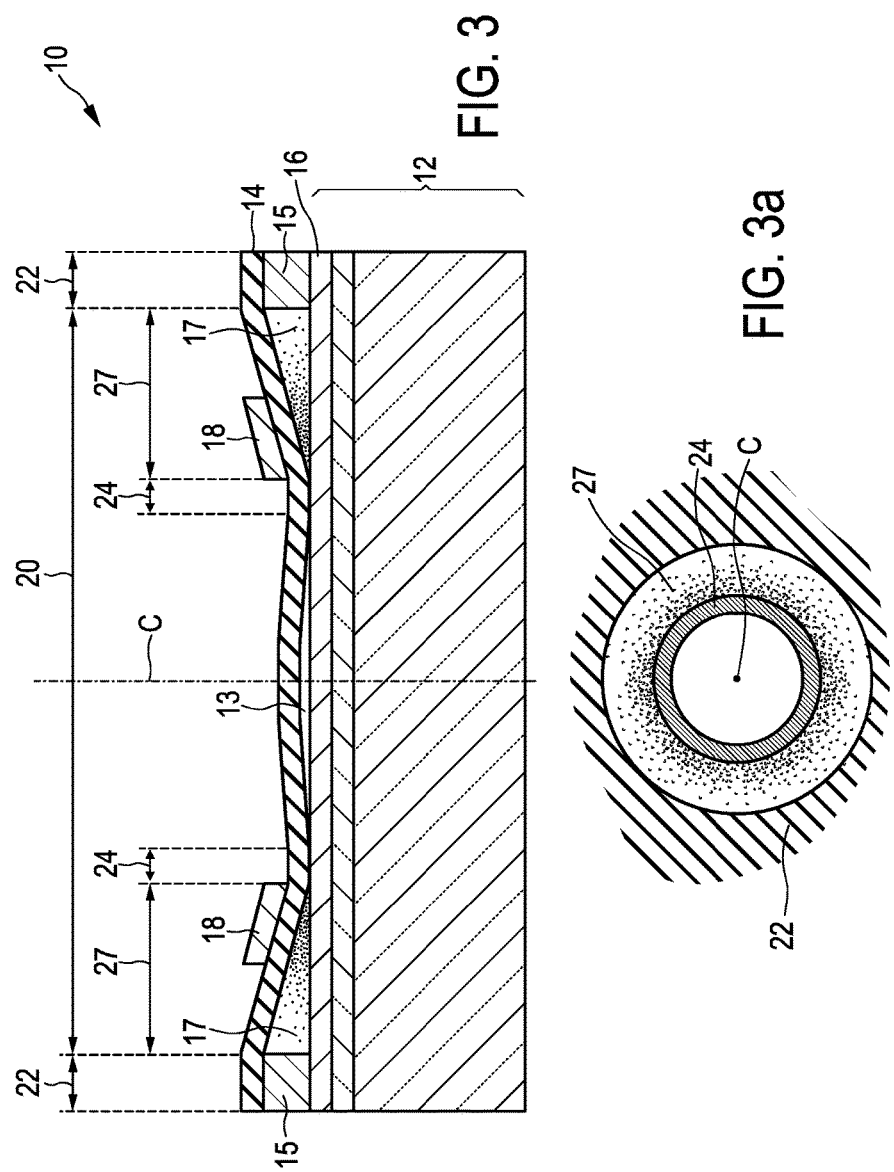

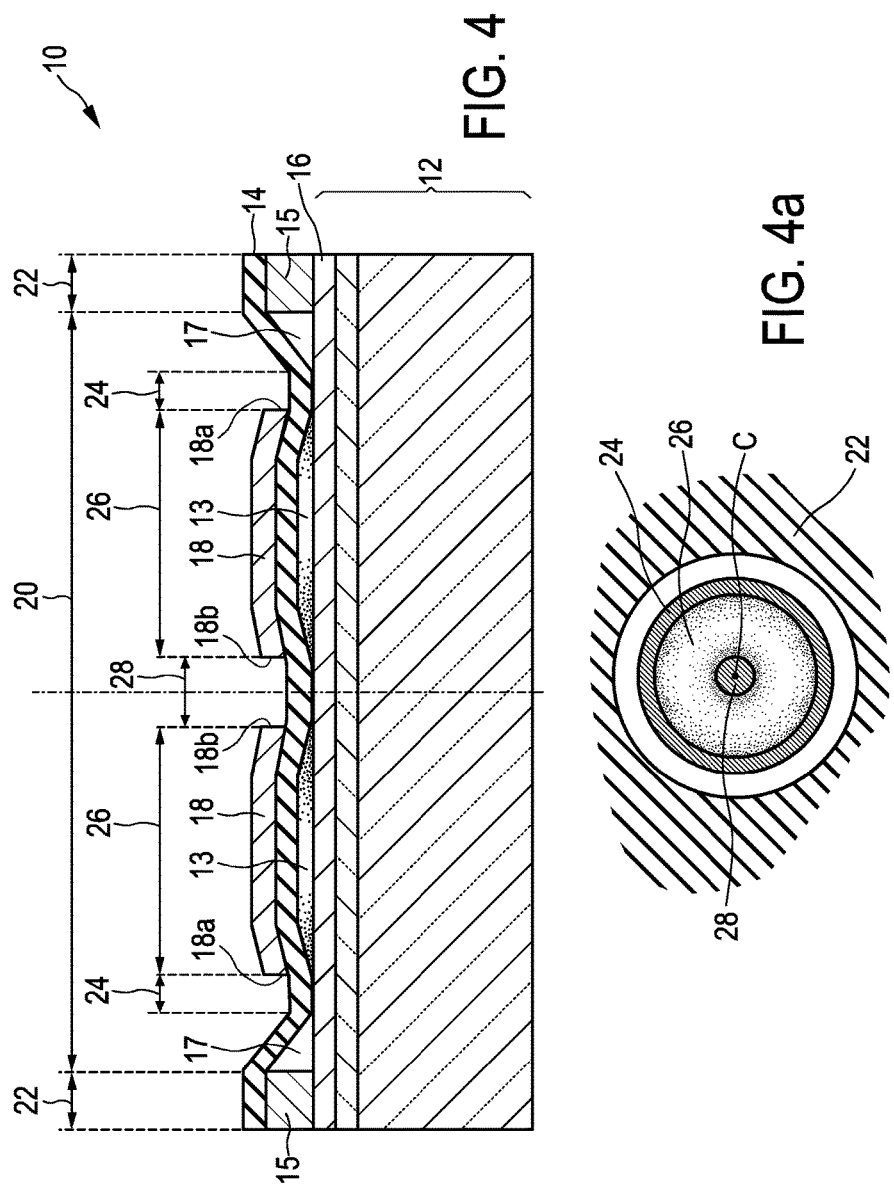

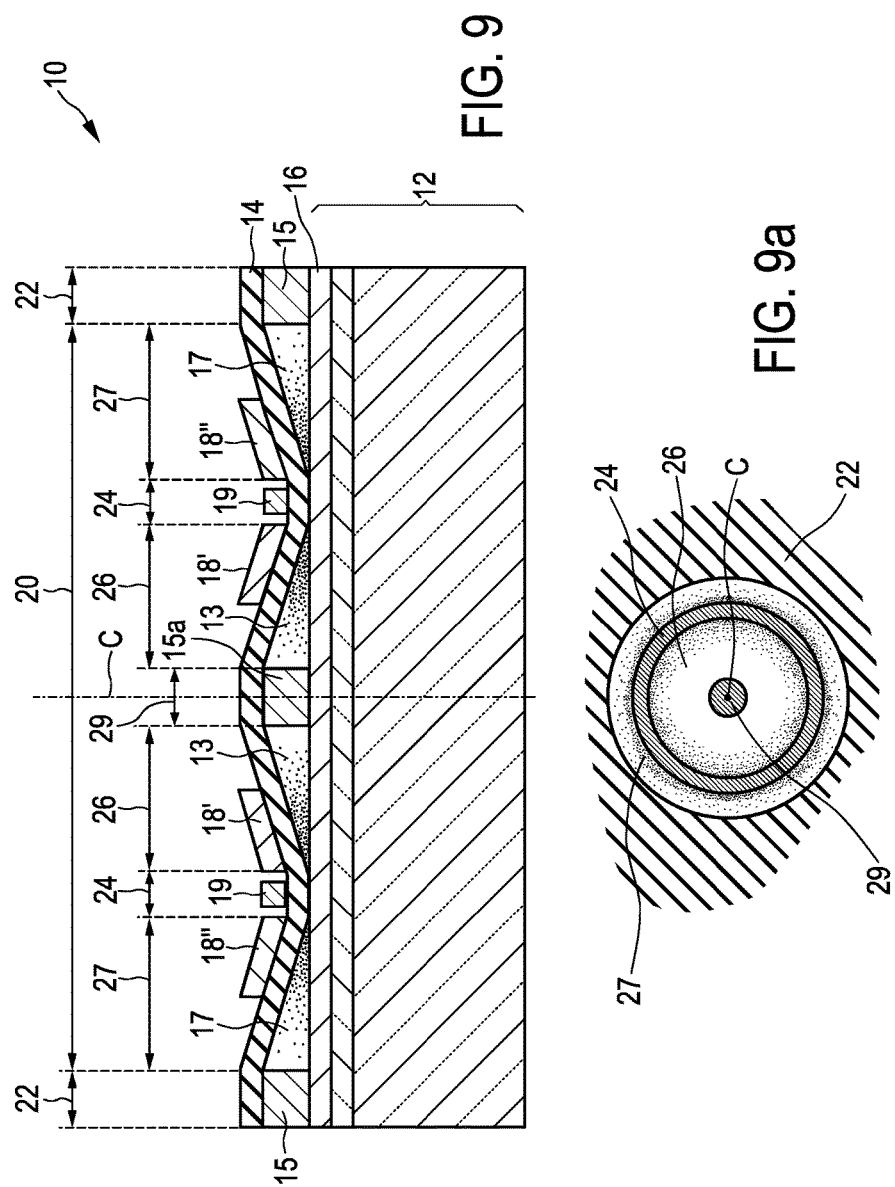

PRE-COLLAPSED CAPACITIVE MICRO-MACHINED TRANSDUCER CELL WITH ANNULAR-SHAPED COLLAPSED REGION

CROSS-REFERENCE TO PRIOR APPLICATIONS

This application is the U.S. National Phase application under 35 U.S.C. §371 of International Application No. PCT/IB2012/056152, filed on Nov. 5, 2012, which claims the benefit of U.S. Provisional Application No. 61/560,836, filed on Nov. 17, 2011. These applications are hereby incorporated by reference herein.

FIELD OF THE INVENTION

The present invention relates to a pre-collapsed capacitive micro-machined transducer cell, in particular a capacitive micro-machined ultrasound transducer (cMUT) cell or a capacitive micro-machined pressure transducer/sensor cell, and a method of manufacturing the same.

BACKGROUND OF THE INVENTION

Recently micro-machined ultrasound transducers (MUT) have been developed. Micro-machined ultrasound transducers have been fabricated in two design approaches, one using a ceramic layer with piezoelectric properties (pMUT) and another using a membrane (or diaphragm) and substrate with electrodes (or electrode plates) forming a capacitor, a so-called capacitive micro-machined ultrasound transducer (cMUT).

A cMUT cell comprises a cavity underneath the membrane. For receiving ultrasound waves, ultrasound waves cause the membrane to move or vibrate and the variation in the capacitance between the electrodes can be detected. Thereby the ultrasound waves are transformed into a corresponding electrical signal. Conversely, an electrical signal applied to the electrodes causes the membrane to move or vibrate and thereby transmitting ultrasound waves. The mechanism by which this receiving or transmitting of waves occurs is called electromechanical coupling, or briefly, "coupling."

Initially, cMUT cells were produced to operate in what is known as an "uncollapsed" mode. The conventional "uncollapsed" cMUT cell is essentially a non-linear device, where the coupling strongly depends on the bias voltage applied between the electrodes.

In order to solve this problem, so-called "pre-collapsed" cMUT cells have recently been developed. In a pre-collapsed cMUT cell a part or region of the membrane is collapsed to the bottom of the cavity (or substrate), the so-called "collapsed region". In one type of "pre-collapsed" cMUT cells the membrane is permanently collapsed or fixed to the substrate, and in another type of "pre-collapsed" cMUT cells the membrane is only temporarily collapsed to the substrate (e.g. only during operation).

Over a wide range of bias voltages the coupling of a pre-collapsed cMUT cell is substantially bias voltage-independent, which makes the cMUT cell much more linear. Further, over the normal voltage range of use, such a "pre-collapsed" cMUT cell provides greater coupling than an "uncollapsed" cMUT cell. The reason is that the cavity or gap between the fixed bottom electrode of the substrate and the flexible top electrode of the membrane determines the capacitance of the cell and therefore its coupling. It is known that the highest coupling is obtained immediately adjacent to the point where the membrane is pulled into contact with the substrate. The region right around the collapsed region has the smallest gap, and therefore makes the greatest contribution to coupling.

A pre-collapsed cMUT cell is for example disclosed in WO 2010/097729 A1. WO 2010/097729 A1 discloses a cMUT transducer cell suitable for use in an ultrasonic cMUT transducer array having a membrane with a first electrode, a substrate with a second electrode, and a cavity between the membrane and the substrate. The cMUT is operated in a pre-collapsed state by biasing the membrane to a collapsed condition with the floor of the cavity, and a lens is cast over the collapsed membrane. When the lens material has polymerized or is of a sufficient stiffness, the bias voltage is removed and the lens material retains the membrane in the collapsed state.

However, there is still a need to provide a pre-collapsed capacitive micro-machined transducer cell with improved performance.

SUMMARY OF THE INVENTION

It is an object of the present invention to provide a pre-collapsed capacitive micro-machined transducer cell having an improved performance and a method of manufacturing the same.

In a first aspect of the present invention a pre-collapsed capacitive micro-machined transducer cell is presented comprising a substrate comprising a first electrode, a membrane comprising a second electrode, wherein the cell has an outer region where the membrane is mounted to the substrate and an inner region inside or surrounded by the outer region, wherein the membrane is collapsed to the substrate in a first collapsed annular-shaped region located within the inner region.

In a further aspect of the present invention a method of manufacturing a pre-collapsed capacitive micro-machined transducer cell is presented, the method comprising providing a substrate comprising a first electrode, providing a membrane comprising a second electrode, wherein the cell has an outer region where the membrane is mounted to the substrate, and an inner region inside or surrounded by the outer region, and collapsing the membrane to the substrate in a first collapsed annular-shaped region located within the inner region.

The basic idea of the invention is to provide an annular-shaped collapsed (or pinned) region. Thus, the collapsed region of the cell is not a circular (non-annular) shaped collapsed region in the center of the cell, which has been the case for cells of the prior art. As defined in mathematics, an annulus is a ring-shaped geometric figure or object (having a hole in its middle), or the area between two concentric closed curves, for example two concentric circles. It will be understood that instead of two circles any other type of closed curve can be used.

As the most strongly coupled area of the transducer cell is immediately adjacent to the collapsed region, this invention increases the high-coupling area. Therefore the effective coupling of the cell is increased. Thus, the performance of the cell is improved since the area providing high coupling is increased. In particular, the height of the cavity between the substrate and the membrane smoothly or continuously decreases to zero at the collapsed region. This annular-shaped collapsed region can in particular be nearer or closer to the periphery of the cell, compared to the central collapsed region of a cell of the prior art. The annular-shaped collapsed region may be used in lieu of or in addition to the central collapsed region.

In the inner region of the cell at least one cavity is formed between the membrane and the substrate. As there is an annular-shaped collapsed region, at least two cavities are formed between the membrane and the substrate. The first cavity is formed between the membrane and the substrate in a region inside (or surrounded by) the annular-shaped collapsed region, and a second cavity is formed between the membrane and the substrate in a region outside (or surrounding) the annular-shaped collapsed region.

With the present invention the transduction efficiency of the cell is improved. First, transduction from electrical energy to mechanical energy generally occurs only in the region of the membrane that is in immediate vicinity to the collapsed region. This is the region of the membrane where the membrane experiences a strong electrostatic force, due to close proximity and concentration of charge, and where the membrane can at the same time move in response to that force. A region of the membrane which is already in contact with the substrate, such as the collapsed region, cannot move. A region of the membrane which can move, but is not in close proximity to the collapsed region, does not have a large concentration of electrical charge. Second, since generally large electrical signals are used to transmit, and large motions are elicited in the membrane, the actual region of strong transduction moves back and forth cross the surface of the transducer cell. By having an annular-shaped collapsed region, the region of high electromechanical coupling, which is the active transduction zone, has been moved away from the center of the cell. Further, two transduction zones, rather than one, can be created. Since this more than doubles the area of the active transduction zone, transduction efficiency is improved. In other words, this more than doubles the length of the active transduction zone without reducing the effective width of it.

Preferred embodiments of the invention are defined in the dependent claims. It shall be understood that the claimed method has similar and/or identical preferred embodiments as the claimed cell and as defined in the dependent claims.

In a first embodiment, the second electrode is located within a first transduction region inside or surrounded by the annular-shaped first collapsed region.

In a second embodiment, the second electrode is located within a second transduction region outside or surrounding the annular-shaped first collapsed region. This embodiment can in particular be used as an alternative to or in combination with the first embodiment.

In a variant, the second electrode is located at least in close proximity to the annular-shaped first collapsed region. In this area, there is only a small gap between the second electrode of the membrane and the corresponding first electrode of the substrate. In this way, increased or maximum electromechanical coupling of the cell is provided. This variant can in particular be used with the first embodiment and/or the second embodiment.

In another embodiment, the second electrode and/or the first electrode has an annular shape. Thus, the electrode(s) is optimally fitted to the annular-shaped collapsed region. In this way the electrode can minimize the non-electromechanically coupled portion of the capacitance of the cell. This embodiment can in particular be used in combination with any other embodiment(s).

In a further embodiment, the annular-shaped first collapsed region is located centered around the center of the cell or membrane. In this way a symmetrical collapsed region and cell can be provided. This embodiment can in particular be used in combination with any other embodiment(s).

In another embodiment, the membrane is further collapsed to the substrate in a second collapsed region located within the inner region. In this way the electromechanically coupled area of the cell is further enlarged. This embodiment can in particular be used in combination with the first and/or the second embodiment. In a variant, the second collapsed region is located in a center region or in the center of the cell or membrane. The second collapsed region can in particular have a circular (non-annular) shape. In another variant, the second electrode is located at least in close proximity to the second collapsed region. For example, an outer edge of the second electrode can be in close proximity to the first collapsed region and an inner edge of the second electrode can be in close proximity to the second collapsed region.

In a further embodiment, the membrane has a built-in stress in the inner region. In this way the cavity between the membrane and the substrate can be formed or maintained, while or when the membrane is collapsed to the substrate in the annular-shaped first collapsed region. Thus, the cavity between the membrane and the substrate can be provided in an easy manner. In particular, the built-in stress can cause the membrane to bulge away from the substrate.

In a further embodiment, the membrane further comprises a third electrode located in the first collapsed region. In this way the annular-shaped first collapsed region can be provided in an easy and/or reliable manner. In particular, a sufficient voltage can be applied between the first (bottom) electrode of the substrate and the third electrode in order to collapse the membrane and provide the annular-shaped first collapsed region. The third electrode can in particular have a circular shape.

Therefore, in another embodiment or variant, when the membrane further comprises the third electrode located in the first collapsed region, collapsing the membrane to the substrate comprises applying a voltage between the first electrode and the third electrode.

In a further embodiment, the membrane further comprises a fourth electrode located in the second collapsed region. In this way the second collapsed region can be provided in an easy and/or reliable manner. In particular, a sufficient voltage can be applied between the first (bottom) electrode of the substrate and the fourth electrode in order to collapse the membrane and provide the central second collapsed region. The fourth electrode can in particular have a circular shape.

Therefore, in another embodiment or variant, when the membrane further comprises the fourth electrode located in the second collapsed region, collapsing the membrane to the substrate comprises applying a voltage between the first electrode and the fourth electrode.

In another embodiment, the second electrode and/or the third electrode having at least one opening in its annular shape, wherein a connector to the fourth electrode and/or the second electrode is located in the opening. This provides a cost effective and less complex cell because no vias over the top of the electrodes are required. In one example, the second electrode can have at least one opening in its annular shape, wherein a connector to the fourth electrode is located in the opening. In another example, the third electrode has at least one opening in its annular shape, wherein a connector to the second electrode is located in the opening.

In another embodiment or variant, the third electrode is separated into segments, wherein a connector to the second electrode extends in between two of the segments of the third electrode. In this way the second electrode and the third electrode are electrically separated or insulated form each other.

In another embodiment, the membrane is permanently collapsed. Thus, the membrane is permanently fixed to the substrate, or mechanically collapsed. This embodiment can in particular be used in combination with any other embodiment(s).

In another embodiment, the membrane is collapsed only during operation of the cell. Thus, the membrane is only temporarily collapsed to the substrate (not permanently), or electrically collapsed (e.g. by applying a bias voltage between two electrodes). Thus, the operation of the cell can comprise the application of a bias voltage. This embodiment can in particular be used in combination with any other embodiment(s).

In another embodiment, the cell is a circular-shaped cell. A circular shape provides a fairly good filling of available space and/or very few higher order vibrational modes, in particular vibrational modes that compete with the desired mode for transmitted energy or create undesired signals that obscure the desired received signals. This embodiment can in particular be used in combination with any other embodiment(s).

In a further embodiment, the cell is a capacitive micro-machined ultrasound transducer cell (cMUT) for transmitting and/or receiving ultrasound waves. In an alternative embodiment, the cell is a capacitive micro-machined pressure transducer (or sensor) cell for measuring pressure. This embodiment can in particular be used in combination with any other embodiment(s).

BRIEF DESCRIPTION OF THE DRAWINGS

These and other aspects of the invention will be apparent from and elucidated with reference to the embodiment(s) described hereinafter. In the following drawings FIG. 1 shows a cross-sectional view of a pre-collapsed capacitive micro-machined transducer cell not according to the invention, FIG. 1a shows a top view of the cell of FIG. 1, FIG. 2 shows a cross-sectional view of a pre-collapsed capacitive micro-machined transducer cell according to a first embodiment of the present invention, FIG. 2a shows a top view of the cell of FIG. 2, FIG. 3 shows a cross-sectional view of a pre-collapsed capacitive micro-machined transducer cell according to a second embodiment of the present invention, FIG. 3a shows a top view of the cell of FIG. 3, FIG. 4 shows a cross-sectional view of a pre-collapsed capacitive micro-machined transducer cell according to a third embodiment of the present invention, FIG. 4a shows a top view of the cell of FIG. 4, FIG. 9 shows a cross-sectional view of a pre-collapsed capacitive micro-machined transducer cell according to a further embodiment of the present invention, and FIG. 9a shows a top view of the cell of FIG. 9.

DETAILED DESCRIPTION OF THE INVENTION

Figure 5:
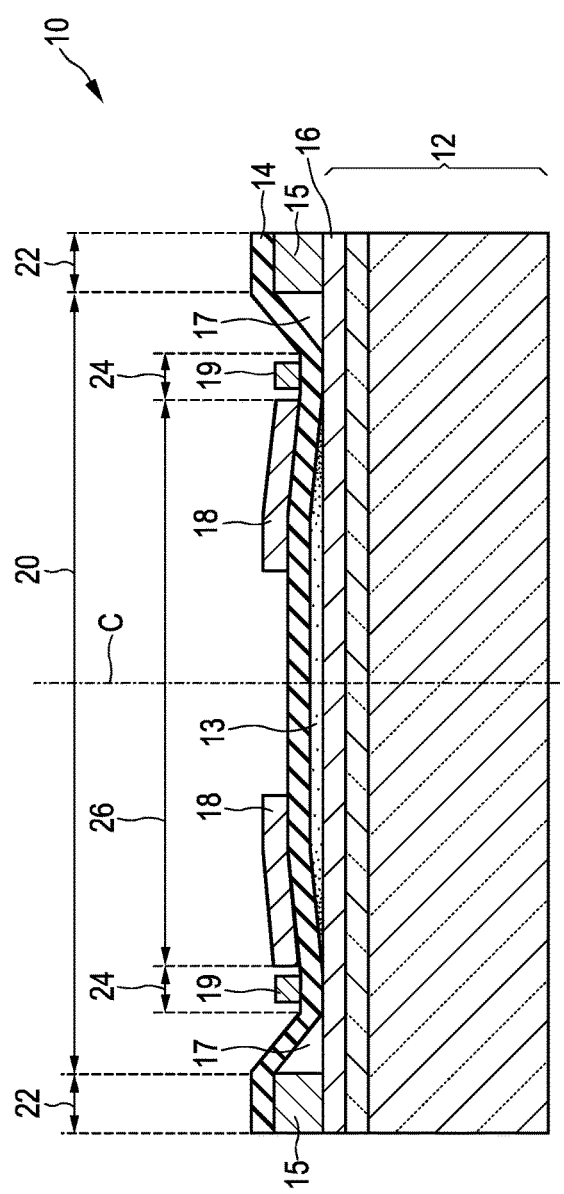
FIG. 5 shows a cross-sectional view of a pre-collapsed capacitive micro-machined transducer cell according to a fourth embodiment of the present invention.

FIG. 1 shows a cross-sectional view of a pre-collapsed capacitive micro-machined transducer cell 10 not according to the invention, and FIG. 1a shows a top view of the cell of FIG. 1. In FIG. 1, the pre-collapsed capacitive micro-machined transducer 10 comprises a substrate 12 comprising a first (bottom) electrode 16 and a membrane 14 comprising a second (top) electrode 18. A cavity 13 is formed between the substrate 12 and the membrane 14. The membrane 14 is collapsed to the substrate 12 in a collapsed region located in the center C of the membrane 14 of cell 10 (or center C of the cell C).

In FIG. 1 as well as FIG. 1a, the shading or dotting in the cavity 13 indicates electromechanical coupling as a function of position. An increased dot density indicates increased coupling. As can be seen, the center region around center C has no coupling because it is collapsed (or pinned) to the substrate 12. Highest coupling is obtained right at the point where the membrane 14 is pulled into contact with the substrate 12. The reason is that the height of the cavity 13 (or gap) between the (fixed) bottom electrode 16 and the (flexible) top electrode 18 determines the capacitance of the transducer cell 10, and therefore its coupling.

In FIG. 1, due to the continuous top electrode 18 extending over the entire membrane region, the collapsed region in the center C adds parasitic capacitance, but no coupling, since it cannot move. As can be seen in FIG. 1, the height of the cavity 13 (or gap) increases monotonically from the edge of the collapsed region toward the perimeter. The further from the center C, the larger the incremental area, but the larger the height of the cavity 13 (or gap). The high-coupling region could for example be increased by applying more bias voltage. This would increase the area and perimeter of the collapsed region, with the perimeter providing increased coupling. Unfortunately, this would also increase the undesirable capacitance of the collapsed region.

FIG. 2 shows a cross-sectional view of a pre-collapsed capacitive micro-machined transducer cell 10 according to a first embodiment of the present invention, and FIG. 2a shows a top view of the cell of FIG. 2. The pre-collapsed capacitive micro-machined transducer cell 10 comprises a substrate 12 comprising a first electrode 16 and a movable or flexible membrane 14 comprising a second electrode 18. A capacitor is formed between the first (bottom) electrode 16 and the second (top) electrode 18. The first electrode 16 is applied on a substrate base material and the second electrode 18 is applied on a membrane base material. However, it will be understood that the first electrode 16 can also be embedded in the substrate base material, and the second electrode 18 can also be embedded in the membrane base material 14, or placed therein or thereon in any other suitable manner.

A cavity 13 is formed between the substrate 12 and the membrane 14. When receiving for example ultrasound waves, ultrasound waves cause the membrane 14 to move or vibrate and the variation in the capacitance between the electrodes 16, 18 can be detected. Thereby the ultrasound waves are transformed into a corresponding electrical signal. Conversely, an electrical signal applied to the electrodes 16, 18 causes the membrane 14 to move or vibrate and thereby transmitting ultrasound waves.

The base material of the substrate 12 can for example be a conductive or semi-conductive material, such as for example silicon. However, it will be understood that any other suitable material can be used. If the base material of the substrate 12 is conductive or semi-conductive, an insulating layer can be applied between the substrate base material and the first (bottom) electrode 16. An insulating layer can be applied on top of the first (bottom) electrode 16. In this way the contacting surfaces are both or all identical insulators. The base material of the membrane 14 can for example be an insulating material, such as for example silicon dioxide, silicon nitride, and/or silicon oxynitride. However, it will be understood that any other suitable material can be used.

As can be seen in FIG. 2a, the cell 10 of this embodiment is a circular-shaped cell having a center C. The cell is (circular) symmetrical around the center C. The cell 10 has an outer region 22 where the membrane 14 is mounted to the substrate 12. In the embodiment of FIG. 2, the cell comprises a support 15 between the substrate 12 and the membrane 14 which is used to mount the membrane 14 to the substrate 12. The height of the cavity (or gap thickness) abruptly or discontinuously goes (from its maximum height) to zero at the support 15. The support 15 can be an annular-shaped support. However, it will be understood that the membrane can be mounted to the substrate in any other suitable way.

The cell 10 further comprises an inner region 20 inside or surrounded by the outer region 22. The inner region 20 is limited by the support 15. In the inner region 20 of the cell the cavity is formed. The membrane 14 is collapsed to the substrate 12 in a first collapsed region 24 located within the inner region 20. The first collapsed region 24 has an annular shape (or ring shape). The annular-shaped first collapsed region 24 is located centered around the center C of the cell 10 (or center C of the membrane 14). The height of the cavity 13 (or gap thickness) smoothly or continuously decreases to zero at the collapsed region 24. The most highly coupled area of the transducer cell 10 is immediately adjacent to the collapsed region 24. Therefore the coupling of the cell is increased. In FIG. 2 as well as FIG. 2a, the shading or dotting in the cavity 13 indicates coupling as a function of position. An increased dot density indicates increased coupling. As can be seen, coupling is negligible in the center C of the cell and increases from the center C towards the pre-collapsed region 24. The electromechanical coupling is sometimes also referred to as "sensitivity" of the cell, even though sensitivity strictly speaking depends on external conditions as well as on electromechanical coupling.

As there is an annular-shaped collapsed region 24 within the inner region 20, a first cavity 13 and a second cavity 17 are formed. The first cavity 13 is inside the annular-shaped collapsed region 24. In other words, the first cavity 13 is formed between the membrane 14 and the substrate 12 in a region inside or surrounded by the annular-shaped collapsed region 24. The second cavity 17 is outside the annular-shaped collapsed region 24. In other words, the second cavity 17 is formed between the membrane 14 and the substrate 12 in a region outside or surrounding the annular-shaped collapsed region 24. The second cavity 17 is annular-shaped.

The second (top) electrode 18 has an annular shape. Thus, the second electrode 18 is optimally fitted to the annular-shaped collapsed region 24. In this way the second electrode 18 can minimize the non-electromechanically coupled portion of the capacitance of the cell. Electromechanical coupling depends on maximizing the ratio of the portion of the capacitance that changes when the membrane moves to the portion that does not change. This is achieved by using an annular-shaped second electrode 18 and thus minimizing the electrode exposure over the pre-collapsed region 24. Alternatively, also a separate electrode not electrically connected to the second electrode 18 can be used.

The second electrode 18 is located (at least) in close proximity to (or immediately adjacent to) the annular-shaped first collapsed region 24. The second electrode 18 is located above the first cavity 13 in the region where the height of the cavity 13 smoothly or continuously decreases to zero. As can be seen in FIG. 2, the outer edge 18a of the second electrode 18 ends at the point where the collapsed region 24 begins. The inner edge 18b of the second electrode 18 defines the hole of the annular-shaped electrode 18. In the embodiment shown in FIG. 2, the second electrode 18 is located within a first transduction region 26 which is inside (or surrounded by) the annular-shaped first collapsed region 24. In other words, the second (top) electrode 18 is located above the first cavity 13 and above the first (bottom) electrode 16. This forms the active transduction zone of the cell.

FIG. 3 shows a cross-sectional view of a pre-collapsed capacitive micro-machined transducer cell according to a second embodiment of the present invention, and FIG. 3a shows a top view of the cell of FIG. 3. The respective explanations and reference numerals for the first embodiment also apply to the embodiment of FIG. 3. Compared to the first embodiment of FIG. 1, in the embodiment of FIG. 3 the second electrode 18 is located within a second transduction region 27 which is outside or surrounding the annular-shaped first collapsed region 24. In other words, the second electrode 18 is located above the second cavity 17. The second electrode 18 is located (at least) in close proximity to (or immediately adjacent to) the annular-shaped first collapsed region 24. The second electrode 18 is located above the cavity 17 in the region where the height of the cavity 17 smoothly or continuously decreases to zero. In FIG. 3 as well as FIG. 3a, the shading or dotting in the cavity 17 indicates coupling as a function of position. An increased dot density indicates increased coupling. As can be seen, coupling is smallest or negligible at the support 15 (or outer region 22 of the cell) and increases towards the pre-collapsed region 24.

It will be understood that also a combination of the first embodiment and the second embodiment is possible. In such a case, the second electrode 18 can comprise a first electrode part located within the first transduction region 26 and a second electrode part located within the second transduction region 27.

FIG. 4 shows a cross-sectional view of a pre-collapsed capacitive micro-machined transducer cell according to a third embodiment of the present invention, and FIG. 4a shows a top view of the cell of FIG. 4. The respective explanations and reference numerals for the previous embodiments also apply to the embodiment of FIG. 4. The cell of the embodiment of FIG. 4 is based on the cell of the embodiment of FIG. 2. However, in the embodiment of FIG. 4, the membrane 14 is further collapsed to the substrate 12 in a second collapsed region 28 located within the inner region 20. In this way the electromechanically coupled area of the cell is further enlarged. The second collapsed region 28 is located in the center C of the cell 10 or membrane 14. The first cavity 13 now has an annular shape. The second collapsed region 28 has a circular (non-annular) shape. In the embodiment of FIG. 4, the annular-shaped second electrode 18 is located within the first transduction region 26, as explained with reference to FIG. 2. The second electrode 18 is located (at least) in close proximity to (or immediately adjacent to) the second collapsed region 28. The second electrode is located both in close proximity to the first collapsed region 24 and in close proximity to the second collapsed region 28. More specifically, the outer edge 18a of the second electrode 18 is located in close proximity of the first collapsed region 24 and the inner edge 18b of the second electrode 18 is located in close proximity to the second collapsed region 28. In FIG. 4 as well as FIG. 4a, the shading or dotting in the cavity 13 indicates coupling as a function of position. An increased dot density indicates increased coupling. As can be seen, coupling is smallest or negligible in the center of the annular-shaped cavity 13 and increases both towards the first collapsed region 24 and towards the second collapsed region 28.

In the embodiments discussed above, the membrane 14 can be permanently collapsed (mechanically collapsed) or the membrane 14 can be collapsed only during operation of the cell (electrically collapsed). Now, with reference to FIG. 5 to FIG. 8, the case of electrical collapsing using additional collapsing electrodes will be described.

FIG. 5 shows a cross-sectional view of a pre-collapsed capacitive micro-machined transducer cell according to a fourth embodiment of the present invention. The respective explanations and reference numerals for the previous embodiments also apply to the embodiment of FIG. 5. The cell of the embodiment of FIG. 5 is the based on the cell of the embodiment of FIG. 2. However, in the embodiment of FIG. 5 the membrane 14 further comprises a third electrode 19 located in the first collapsed region 24. The third electrode 19 is used to collapse the membrane 14 to the substrate 12. The membrane 12 is collapsed to the substrate 12 by applying a (sufficient) voltage between the first electrode 16 and the third electrode 19. Thus, the third electrode 19 of the membrane 14 is used to collapse the membrane or cell (also called collapsing electrode), and the second electrode 18 of the membrane 14 is the sense electrode. Because these electrodes 18, 19 are electrically separated, the pre-collapsed region 24 does not contribute to parasitic capacitance.

Figure 6:
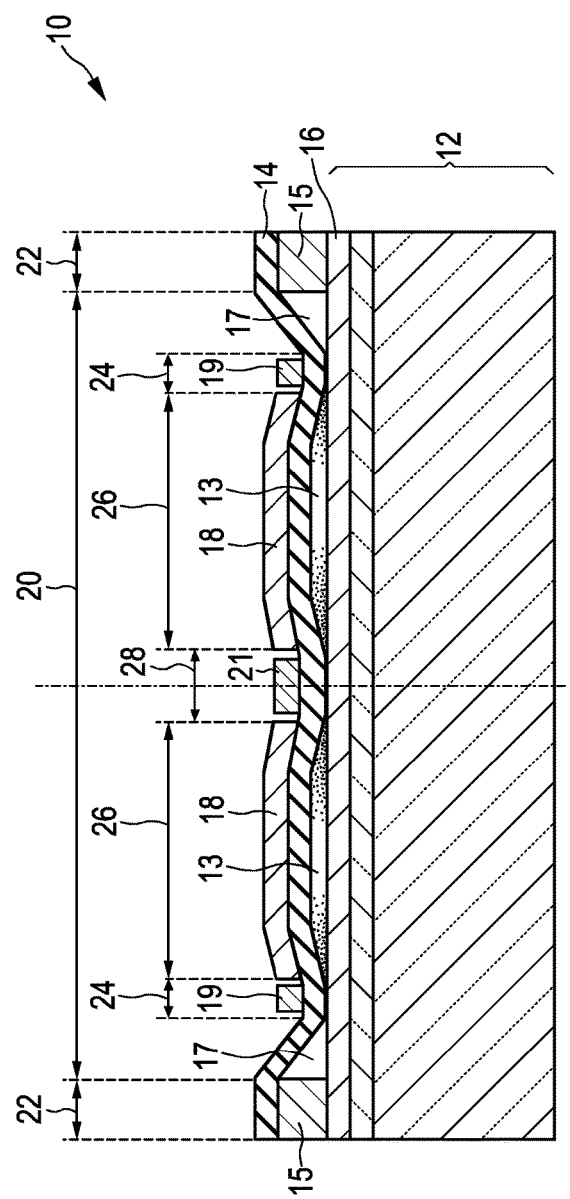
FIG. 6 shows a cross-sectional view of a pre-collapsed capacitive micro-machined transducer cell according to a fifth embodiment of the present invention.

FIG. 6 shows a cross-sectional view of a pre-collapsed capacitive micro-machined transducer cell according to a fifth embodiment of the present invention. The respective explanations and reference numerals for the previous embodiments also apply to the embodiment of FIG. 6. The cell of the embodiment of FIG. 6 is based on the cell of the embodiment of FIG. 4. However, in the embodiment of FIG. 6 the membrane 14 further comprises a third electrode 19 located in the first collapsed region 24 (see explanation to FIG. 5) and a fourth electrode 21 located in the second collapsed region 28. The third electrode 19 and the fourth electrode 21 are used to collapse the membrane 14 to the substrate 12. The membrane 14 is collapsed to the substrate 12 by applying a (sufficient) voltage between the first electrode 16 and the third electrode 19, and by applying a (sufficient) voltage between the first electrode 16 and the fourth electrode 21. Thus, the third electrode 19 and the fourth electrode 21 of the membrane 14 are used to collapse the membrane or cell (also called collapsing electrodes), and the second electrode 18 of the membrane 14 is the sense electrode.

Figure 7:
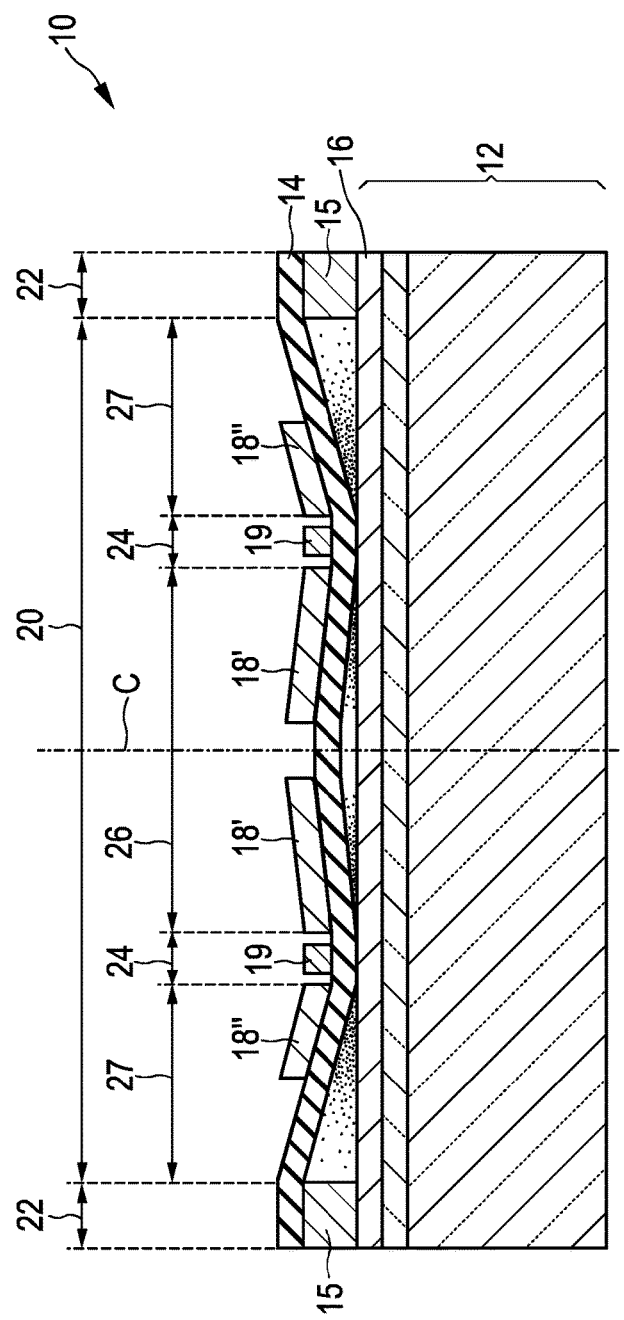
FIG. 7 shows a cross-sectional view of a pre-collapsed capacitive micro-machined transducer cell according to a sixth embodiment of the present invention, FIG. 8a-c each shows a different example of a top view of the electrodes of a pre-collapsed capacitive micro-machined transducer cell according to the fifth embodiment of FIG. 6.

FIG. 7 shows a cross-sectional view of a pre-collapsed capacitive micro-machined transducer cell 10 according to a sixth embodiment of the present invention. The respective explanations and reference numerals for the previous embodiments also apply to the embodiment of FIG. 7. The cell of the embodiment of FIG. 7 is based on the cell of a combination of the first embodiment and the second embodiment. Thus, the second electrode comprises a first annular-shaped electrode part 18' (located within the first transduction region 26) and a second annular-shaped electrode part 18" (located within the second transduction region 27). However, in the embodiment of FIG. 7, the membrane 14 further comprises a third electrode 19 located in the first collapsed region 24 (see explanation to FIG. 5 or FIG. 6). The third electrode is thus located between the first annular-shaped (inner) electrode part 18' (which is inside the annular-shaped collapsed region 24) and the second annular-shaped (outer) electrode part 18" (which is outside the annular-shaped collapsed region 24).

Figure 8C:
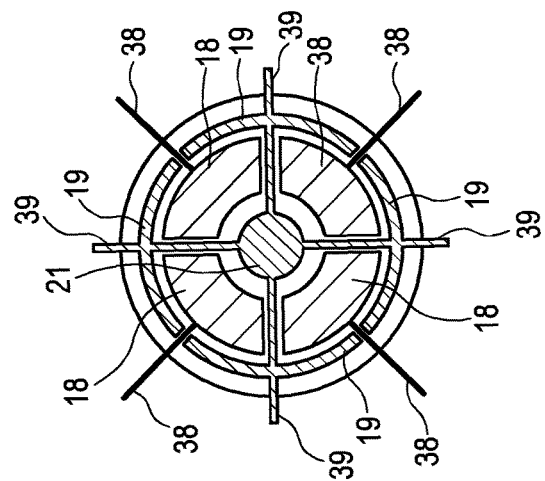
Figure 8B:
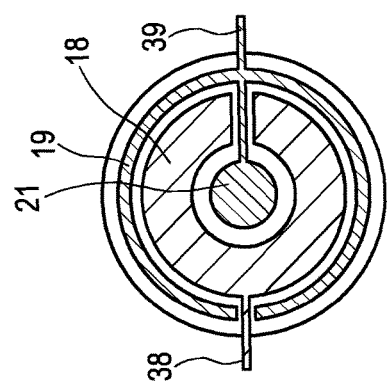
Figure 8A:
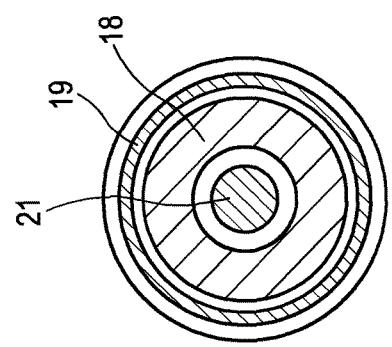

FIG. 8a-c each shows a different example of a top view of the electrodes of a pre-collapsed capacitive micro-machined transducer cell according to the fifth embodiment of FIG. 6. In each of FIG. 8a-c, the second (sense) electrode 18, the third (collapsing) electrode 19, and the fourth (collapsing) electrode 21 are shown. The second (sense) electrode 18 is electrically separated from the third (collapsing) electrode 19 and/or fourth (collapsing) electrode 21. The third and fourth (collapsing) electrodes 19, 21 can be electrically connected. However, the third and fourth (collapsing) electrodes 19, 21 can also be electrically separated, if there is a need or desire to apply different voltages to the third and fourth (collapsing) electrodes 19, 21.

FIG. 8b or FIG. 8c also shows connector(s) 38 to the second annular-shaped electrode 18 and connector(s) 39 to the third electrode 19 and the fourth electrode 21. Thus, FIG. 8b or FIG. 8c shows exemplary electrode geometries in order to route the electrodes to provide for independent access to the center. In each of FIG. 8a-c, independent access to the center is needed to get the voltage to electrode 21 without connecting it to electrode 18. In FIG. 8a this could for example be accomplished by vias over the top of electrode 18. However, this would require several extra process steps, adding cost and complexity to the devices. In FIG. 8b, the second electrode 18 has a single opening in its annular-shaped form and the third electrode 19 has a single opening in its annular shape. A connector 39 to the fourth electrode 21 is located in the opening of the second electrode 18, and a connector 38 to the second electrode 18 is located in the opening of the third electrode 19. In FIG. 8c, the second electrode 18 has multiple openings in its annular shape and the third electrode 19 has multiple openings in its annular shape. In this way the second electrode 18 and the third electrode 19 are each separated into segments. In FIG. 8c, each of the electrodes 18, 19 is separated into four segments. It may be desirable to separate each electrode into more segments to provide more approximate radial symmetry. However, the electrodes can also be separated in less segments, thus at least two segments. The segments can be connected externally, outside the inner region (or membrane region). As can be seen in FIG. 8c, each connector 38 to the second electrode 18 extends in between two of the segments of the third electrode 19. Each connector 39 extends between two of the segments of the second electrode 18. In other words, one connector 39 to the fourth electrode 21 is located in each of the openings of the second electrode 18, and one connector 38 to the second electrode 18 is located in each of the opening of the third electrode 19.

In general, in a pre-collapsed cell the membrane can be collapsed using different methods, for example using electrical collapsing or mechanical collapsing. In one example, the membrane 14 can have a built-in stress in the inner region. In particular, the built-in stress can cause the membrane to bulge away from the substrate. In this way the cavity 13, 17 between the membrane 14 and the substrate 12 is provided. Without the built-in stress, the first transduction region 26 (the region inside or surrounded by the annular-shaped collapsed region 24) could stay in contact with the substrate 12.

In one example, the residual stress of the membrane 14 in the first transduction area 25 can be made compressive so that there is the first cavity 13 (or gap). The compressive stress region would have to be between the neutral plane of the membrane and the surface of the membrane distal (or facing away) from the cavity or gap. Further, the compressive stress region can extend from the center out to approximately the radius of the annular-shaped collapsed region. As known in mechanical engineering's theory of plates and shells, there is a neutral plane in a membrane which undergoes no stretching or compression when the membrane is bent. Any compressive stress on one side of the neutral plane will bend the membrane concave away from the stressed side, and conversely, any tensile stress on one side of the neutral plane will bend the membrane concave toward the stressed side.

In an alternative example, the stress can be tensile and between the neutral plane of the membrane and the surface of the membrane proximal to (or facing towards) the cavity or gap. Other examples can include tensile distal and over the collapsed ring, compressive proximal over the collapsed ring, or any combination of the aforementioned examples. Further, there can be additional layers outside the collapsed ring, for example compressive and distal, or tensile proximal.

The built-in stress of the membrane can for example be controlled through the stoichiometry of the membrane and/or by use of a multilayer membrane with different materials and stress in the layers. For example, material deposition conditions also influence membrane stress. As a specific example, if the base material of the membrane is made of silicon dioxide, silicon nitride, and/or silicon oxynitride, silicon dioxide can be compressive, silicon nitride can be tensile, and the stress in silicon oxynitride can be controlled with stoichiometry. The composition of the electrode materials can also contribute to the stress. Additional stress contributions may be included through choices of electrode materials and deposition parameters, as well as through patterned layers of appropriate additional materials.

FIG. 9 shows a cross-sectional view of a pre-collapsed capacitive micro-machined transducer cell according to a further embodiment of the present invention, and FIG. 9a shows a top view of the cell of FIG. 9. The respective explanations and reference numerals for the previous embodiments also apply to the embodiment of FIG. 9. In the embodiment of FIG. 9, the membrane 14 is mounted to the substrate 12 in a central region 29 by a post or protrusion 15a on the planar surface of the substrate 12 (or its electrode 16). The protrusion 15a is located between the substrate 12 and the membrane 14. The first annular-shaped cavity 13 is formed between the membrane 14 and the substrate 12 in the region surrounding the protrusion 15a. Preferably the protrusion 15a can be provided in the same process step as providing support 15. The protrusion 15a is circular-shaped and located in the central region 29 around the center C of the cell. The height of the cavity 13 (or gap thickness) abruptly or discontinuously goes (from its maximum height) to zero at the protrusion 15a. Thus, the protrusion 15a is not a second collapsed region and does thus not provide more coupling (compared to the embodiment of FIG. 4 or FIG. 6 having a second collapsed region). However, the embodiment of FIG. 9 is robust and easy to manufacture. In the embodiment of FIG. 9, the membrane 14 is collapsed by a bias voltage applied to the third (collapsing) electrode 19, not by applying stress on the membrane 14. Thus, a built-in stress in the membrane is not necessary in the embodiment of FIG. 9.

In FIG. 9 as well as FIG. 9a, the shading or dotting in the first cavity 13 and in the second cavity 17 indicates coupling as a function of position. An increased dot density indicates increased coupling. As can be seen, in the annular-shaped second cavity 17 coupling is smallest or negligible at the support 15 (or outer region 22 of the cell) and increases towards the pre-collapsed region 24. In the annular-shaped first cavity 13 coupling is smallest or negligible at the protrusion 15a (at center C) and increases towards the pre-collapsed region 24.

It is pointed out that the cross-sectional view of FIG. 9 shows one single (circular-shaped) cell 10, as can be seen in the top view of FIG. 9a. The cell 10 is (circular) symmetrical around the center C or central protrusion 15a. Further, in the embodiment of FIG. 9, the second electrode comprises a first annular-shaped electrode part 18' (located within the first transduction region 26) and a second annular-shaped electrode part 18" (located within the second transduction region 27). However, it will be understood that the second electrode can also be only located either in the first transduction region 26 or the second transduction region 27.

In the embodiments described above with reference to FIG. 2 to FIG. 9, the first (bottom) electrode 16 is shown to be a continuous layer which is applied to the substrate base material and which extends over the entire inner region 20 (or membrane or cell). However, it will be understood that any other suitable first electrode can be used. For example, the first electrode could be an annular-shaped electrode and/or could not extend over the entire inner region (or membrane or cell). Even though, in the embodiments described above with reference to FIG. 2 to FIG. 7, the second electrode 18 is an annular-shaped electrode and does not extend over the entire inner region 20 (or membrane or cell), it will be understood that any other suitable second electrode can be used. For example, the second electrode could be a circular-shaped electrode and/or could extend over the entire inner region (or membrane or cell). In all cases or embodiments described herein, the electrode configurations may be interchanged between the membrane and the substrate without affecting the operation of the transducer cell.

In the embodiments described above with reference to FIG. 2 to FIG. 9, the cell 10 is a circular-shaped cell. A circular shape provides a fairly good filling of available space and/or very few higher order vibrational modes, in particular vibrational modes that compete with the desired mode for transmitted energy or create undesired signals that obscure the desired received signals. However, it will be understood that any other suitable cell shape can be used, such as an elliptical, polygonal, hexagonal, rectangular or square shape, or the like. Thus, the circular symmetry used to describe the concepts should not be considered limiting.

The present invention can be further described based on one or more of the following embodiments. In a first embodiment, the collapse is initiated in the annular region away from the center, instead of or in addition to the usual collapse region in the center. In this way the area of active transduction is increased greatly. In a second embodiment, one or two electrodes may provide the collapsed regions, one in the center of the device and the second further around the perimeter. In a third embodiment, a separate annular electrode is provided for transduction. In a fourth embodiment, the membrane may be constructed with a built-in stress distribution which will cause the membrane to bulge away from the substrate in the transduction region.

From a technology point of view, the pre-collapsed capacitive micro-machined transducer cell (in particular cMUT) of the present invention can in principle be manufactured in the same or a similar way as a conventional "uncollapsed" capacitive micro-machined transducer cell (in particular cMUT), which is for example described in detail in WO 2010/032156, which is incorporated by reference herein.

The present invention is applicable to any capacitive micro-machined ultrasound transducer cell (cMUT) for transmitting and/or receiving ultrasound waves, in particular to a cMUT cell large enough to support the multiple electrode structure (e.g. at least up to 30 MHz, or higher). However, in principle the present invention is also applicable to any other pre-collapsed capacitive micro-machined transducer, such as for example a pressure sensor or transducer for measuring pressure. It shall be understood that the term transducer also includes the special case of a sensor.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A pre-collapsed capacitive micro-machined transducer cell comprising:
   a substrate comprising a first electrode,
   a membrane comprising a second electrode,
   an outer region including a support where the membrane is mounted to the substrate,
   an inner region surrounded by the outer region,
   wherein the membrane is collapsed to the substrate in an annular-shaped first collapsed region located within the inner region to form an annular-shaped cavity between the membrane and the substrate which surrounds the annular-shaped first collapsed region, wherein a height of the annular-shaped cavity continuously decreases from the support to the annular-shaped first collapsed region; and
   wherein the second electrode is located above the annular-shaped cavity to provide a transduction region surrounding the annular-shaped first collapsed region.

2. The cell of claim 1, wherein the second electrode is located at least in close proximity to the annular-shaped first collapsed region.

3. The cell of claim 1, wherein the second electrode and/or the first electrode have/has an annular shape.

4. The cell of claim 1, wherein the annular-shaped first collapsed region is located centered around the center of the cell or membrane.

5. The cell of claim 1, wherein the membrane is further collapsed to the substrate in a second collapsed region located within the inner region.

6. The cell of claim 5, wherein the second collapsed region is located in a center region or in the center of the cell or membrane.

7. The cell of claim 1, wherein the membrane has a built-in stress in the inner region, wherein the built-in stress is controlled through stoichiometry of the membrane, use of a multilayer membrane, or combinations thereof.

8. The cell of claim 1, the membrane further comprising a third electrode located in the first collapsed region.

9. The cell of claim 8, wherein the second electrode and/or the third electrode have/has at least one opening, and wherein a connector to the fourth electrode and/or the second electrode are/is located in the opening.

10. The cell of claim 1, wherein the membrane is permanently collapsed.

11. The cell of claim 1, wherein the membrane is collapsed only during operation of the cell.

12. The cell of claim 1, further comprising a second collapsed region located within the inner region and a third electrode located within the second collapsed region.

13. The cell of claim 1, wherein the transduction region surrounding the annular-shaped first collapsed region is a first transduction region, and wherein the cell further comprises another electrode located over a second cavity surrounded by the annular-shaped first collapsed region to provide a second transduction region inside the inner region.

14. A method of manufacturing a pre-collapsed capacitive micro-machined transducer cell, the method comprising:
   providing a substrate comprising a first electrode,
   providing a membrane comprising a second electrode, wherein the cell has an outer region including a support where the membrane is mounted to the substrate, and an inner region surrounded by the outer region, and
   collapsing the membrane to the substrate in a annular-shaped first collapsed region located within the inner region to form an annular-shaped cavity between the membrane and the substrate, wherein the annular-shaped cavity surrounds the annular-shaped first collapsed region, and wherein a height of the annular-shaped cavity continuously decreases from the support to the annular-shaped first collapsed region,
   wherein the providing a membrane comprising a second electrode includes locating the second electrode above the annular-shaped cavity to
   provide transduction region surrounding the annular-shaped first collapsed region.

15. The method of claim 14, the membrane further comprising a third electrode located in the annular-shaped first collapsed region,
   wherein collapsing the membrane to the substrate comprises applying a voltage between the first electrode and the third electrode.

16. The method of claim 14, wherein the transduction region surrounding annular-shaped the first collapsed region is a first transduction region, the method further comprising providing another electrode over a second cavity surrounded by the annular-shaped first collapsed region to provide a second transduction region inside the inner region.

* * * * *